United States Patent

Ulrich

[11] 3,941,330
[45] Mar. 2, 1976

[54] SAFETY BELT RETRACTOR
[75] Inventor: Charles J. Ulrich, Montecito, Calif.
[73] Assignee: American Safety Equipment Corporation, Encino, Calif.
[22] Filed: Dec. 16, 1974
[21] Appl. No.: 532,881

[52] U.S. Cl. ................................ 242/107.4 R
[51] Int. Cl.² ................................ B65H 75/48
[58] Field of Search .......................... 242/107.4;
297/386–388; 280/150 SB

[56] References Cited
UNITED STATES PATENTS

| | | | |
|---|---|---|---|
| 3,482,799 | 12/1969 | Wrighton et al. ............... | 242/107.4 |
| 3,604,655 | 9/1971 | Jones ............................. | 242/107.4 |
| 3,865,329 | 2/1975 | Higbee et al. .................. | 242/107.4 |

Primary Examiner—Leonard D. Christian
Attorney, Agent, or Firm—Poms, Smith, Lande & Glenny

[57] ABSTRACT

A safety belt retractor is provided having a frame, a shaft extending transversely of the frame and journalled for rotation thereon, a reel fixed to the shaft and having one end of a strap secured to the shaft and wound about the reel, the other end of the strap extending outwardly of the frame and means for rewinding the strap onto the reel. At least one ratchet tooth gear is mounted on the shaft and rotatable therewith and a lockbar is also mounted on the frame and has at least one locking pawl adapted to engage the teeth of the gear, the lockbar being movable between positions engaging the teeth and out of engagement therewith. Means are provided for moving the lockbar into engagement with the teeth of the ratchet tooth gear and releasing the lockbar from engagement with the teeth of the ratchet tooth gear upon rewinding of the strap back onto the reel. Means are also provided for preventing the reel from rotation in either direction when the lockbar is in locking engagement with the gear and a load is placed on the strap above a predetermined amount. Although the strap cannot now be unwound from or rewound onto the reel, the retractor continues to take the load for which it was designed before complete failure thereof.

10 Claims, 7 Drawing Figures

SAFETY BELT RETRACTOR

BACKGROUND OF THE INVENTION

1. Field of the Invention

The invention relates to improvements in safety belt devices, and, more particularly, to self-retracting safety belt retractors for use on vehicles or the like.

2. Description of the Prior Art

Safety belt retractors of the type disclosed herein have been developed over the years for use in aircraft, automobiles, and similar vehicles or the like. These retractors generally combine a frame having a shaft-supported reel thereon with a belt or strap automatically wound thereon and unwound therefrom. Such reels normally include a rewind spring to wind the belt or strap back onto the reel and cooperating locking means acting to lock the reel against rotation. Examples of such retractors are those which lock up when extension of the strap off of the reel is stopped.

It has been suggested that, after a crash or the like when portions of such retractors might have been rendered unsafe for further use, some means be provided for warning the user of this situation. At this time, there is nothing to prevent a user from using such retractors after they have been subjected to a dangerous load level, such as in a crash, with the attendant possibility of subsequent failure of the retractor upon exposure to a second crash or the like.

SUMMARY OF THE INVENTION

It is an object of this invention to provide a safety belt retractor which, after being subjected in a crash or the like to a load level which renders some part of the retractor unsafe for further use, warns the user of this situation.

It is a further object of this invention to provide such a safety belt retractor where, after being subjected to a crash or the like, prevents the reel thereof from rotation in either direction, i.e., either unwind the strap off of the reel or rewind the strap back onto the reel.

It is still another object of this invention to carry out the foregoing objects in a manner whereby the retractor, even though the web or strap cannot be unwound from the reel or rewound thereon, continues to take the load for which it was designed before complete failure thereof.

These and other objects are preferably accomplished by providing a safety belt retractor having a frame, a shaft extending transversely to the frame and journalled for rotation thereon, a reel fixed to the shaft and having one end of a strap secured to the shaft and wound about the reel, the other end of the strap extending outwardly of the frame and means for rewinding the strap onto the reel. At least one ratchet tooth gear is mounted on the shaft and rotatable therewith and a lockbar is also mounted on the frame and has at least one locking pawl adapted to engage the teeth of the gear, the lockbar being movable between positions engaging the teeth and out of engagement therewith. Means are provided for moving the lockbar into engagement with the teeth of the ratchet tooth gear and releasing the lockbar from engagement with the teeth of the ratchet tooth gear upon rewinding of the strap back onto the reel. Means are further provided for preventing the reel from rotation in either direction when the lockbar is in locking engagement with the gear and a predetermined load is placed on the strap. Although the strap cannot now be unwound from or rewound onto the reel, the retractor continues to take the load for which it was designed before complete failure thereof.

DESCRIPTION OF THE PREFERRED EMBODIMENT

Figure 1:
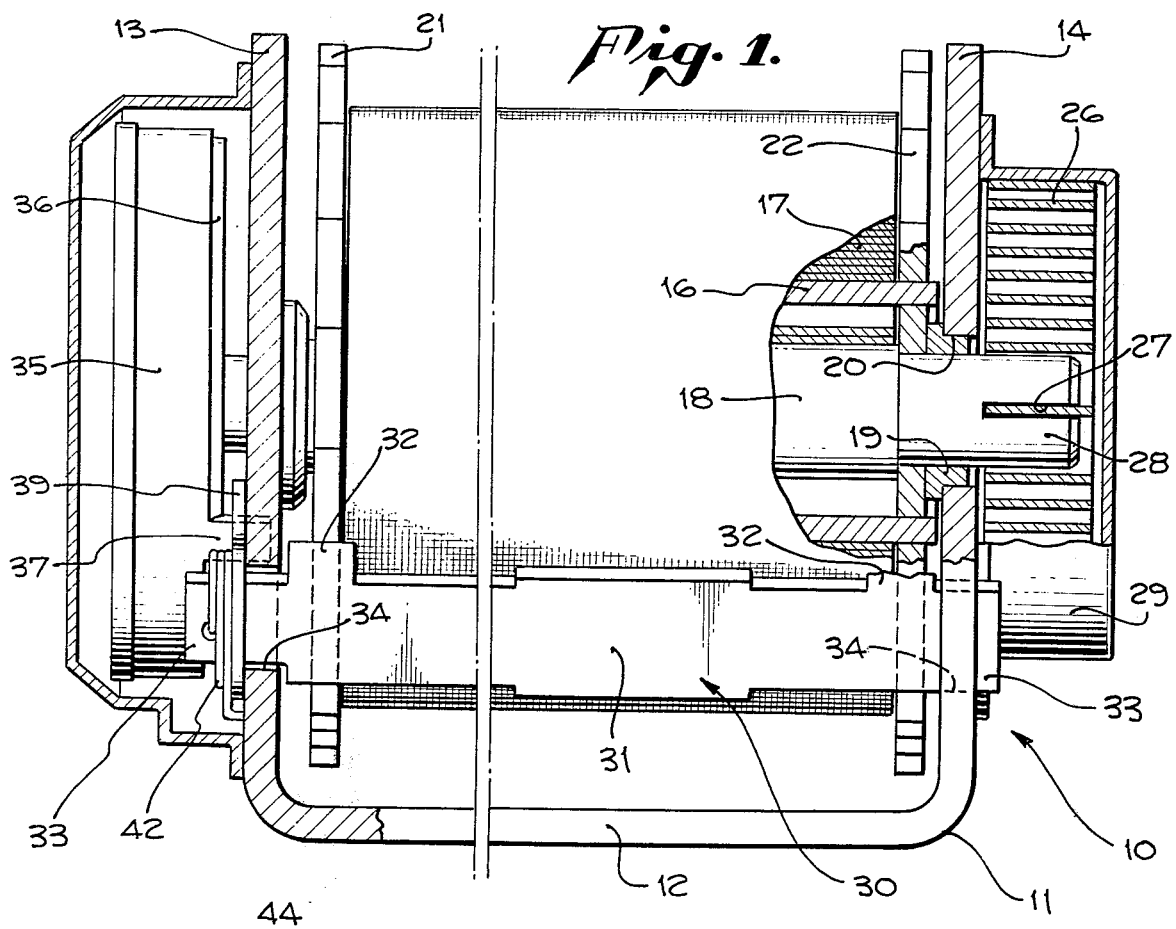
FIG. 1 is a vertical cross-sectional view of one example of safety belt retractor illustrating means thereon for carrying out the techniques of this invention.

Referring now to the drawing, and more particularly to FIG. 1, the general configuration of a seat belt retractor, indicated generally at 10, of will be described. It is to be understood that the techniques of this invention may be applicable to many types of seat belt retractors, such as those with self-locking reels or the so-called inertia reel type. Thus, although the invention will be described hereinbelow with respect to an inertia reel, the invention is not limited thereto. The retractor 10 thus includes a housing, indicated generally at 11, which comprises a base 12 and a pair of side walls or flanges 13 and 14. It can be seen with reference to FIG. 2 that base 12 may include an extension portion 15 for securing retractor 10 to a desired support in a vehicle or the like, such as the frame of the vehicle. Portion 15 may have one or more suitable apertures therein (aperture 15' in FIG. 5) to accomplish this.

The retractor 10 further includes a reel 16 on which a strap 17 is wound when retracted and from which the strap may be unwound. The reel 16 of the retractor 10 may be rotatably supported relative to the housing 11 through a shaft 18 extending through bearings 19 disposed in openings 20 in the side walls or flanges 13, 14 of housing 11. It can be seen in FIG. 2 that openings 20 are preferably generally centrally located in side walls or flanges 13, 14. Also, it is to be understood that the free end of strap 17 is adapted to extend outwardly of reel 16 for attachment to the user's shoulder harness or the like (not shown).

Figure 3:
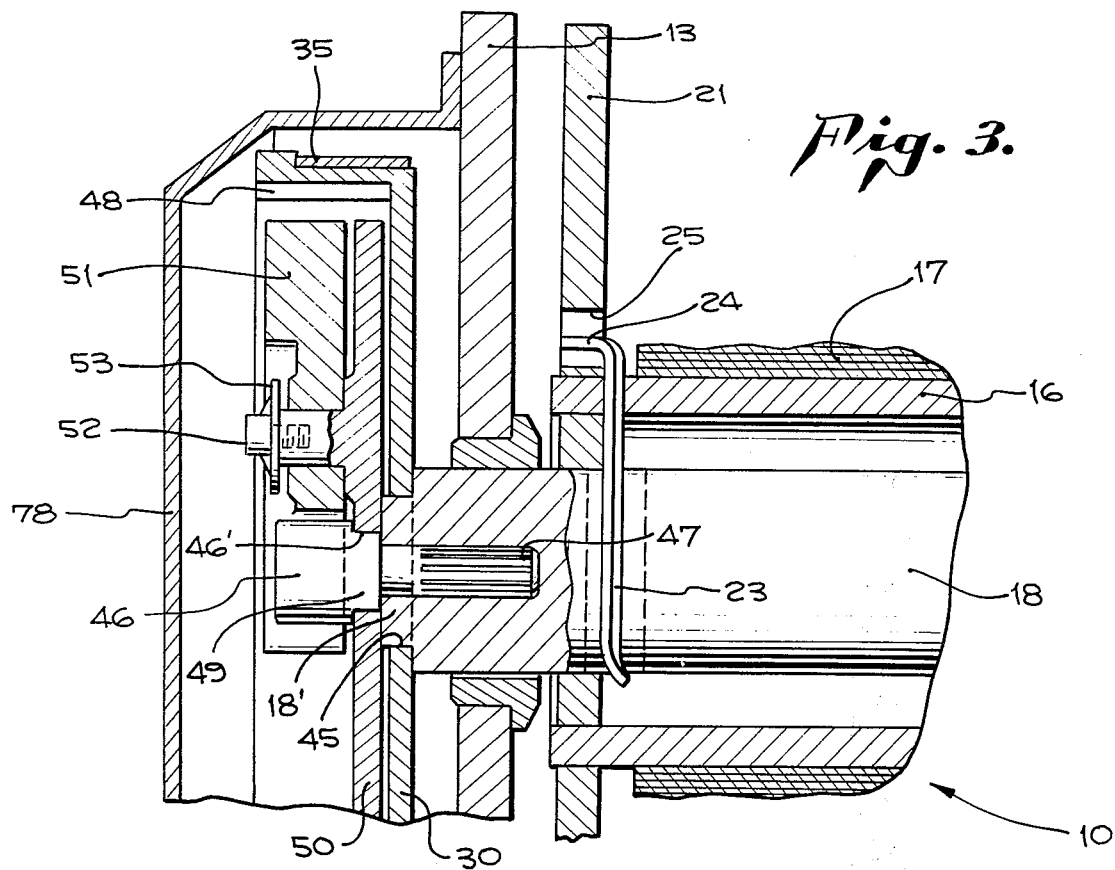
FIG. 3 is a cross-sectional side view of the reel of FIGS. 1 and 2.

Reel 16 also carries ratchet wheel means which may comprise a pair of spaced ratchet wheels 21, 22 which are keyed for rotation to reel 16 and also generally centrally located thereon. As can be seen in FIG. 1, wheels 21, 22 are generally circular and preferably of an overall diameter that they do not extend beyond the outer limits of side walls or flanges 13, 14. In the exemplary embodiment, such ratchet wheels 21, 22 are adapted to prevent rotation of reel 16 in one direction such as in the direction which would permit protraction of strap 17 off of reel 16 as will be more fully explained hereinafter. The shaft 18 thus passes through reel 16 and is secured against axial movement relative to the housing 11 by a spring member or retainer 23 (FIG. 3) interposed between the ratchet wheel 21 and shaft 18 with a leg portion 24 engaged in a slot 25 provided in wheel 21 which retains shaft 18 in place within reel 16.

The retractor 10 also includes a windup spring 26 (FIG. 1) which is secured at its inner end to a slot 27 provided in a reduced end portion 28 of shaft 18 and by its outer end fixed to the inner wall of a spring cup 29. The spring 26 constantly biases the reel 16 in a counterclockwise direction, as viewed in FIG. 2, so as to constantly bias the strap 17 toward full retraction.

Retractor 10 also includes retractor locking means, indicated generally at 30 in FIG. 1, which means includes a ratchet wheel pawl 31, engaging tabs 32, and laterally extending pivot arms 33 received in openings 34 in side walls or flanges 13, 14 for pivotal movement of pawl 31. The retractor locking means 30 further includes a clutch spring 35 (FIG. 2) surrounding the outer periphery of a circular cup member 36. Clutch spring 35 has a lug or tab 37 projecting therefrom which tab 37 extends into a slot 38 formed in a biasing spring lever member 39, to provide a stop as well be discussed further hereinbelow, and into an opening 40 formed in side wall or flange 13. Lever member 39 is of substantially flat shape and opening 40 is provided with an inclined portion 41 for conformably receiving therein pivot arms 33. An elongated spring member 42 is secured at one end in an opening 43 in side wall or flange 13 and extends about and is secured at its other end to pivot arm 33. Thus, the tabs 32 of pawl 31 are normally biased out of locking engagement with the teeth of ratchet wheels 21, 22.

Figure 2:
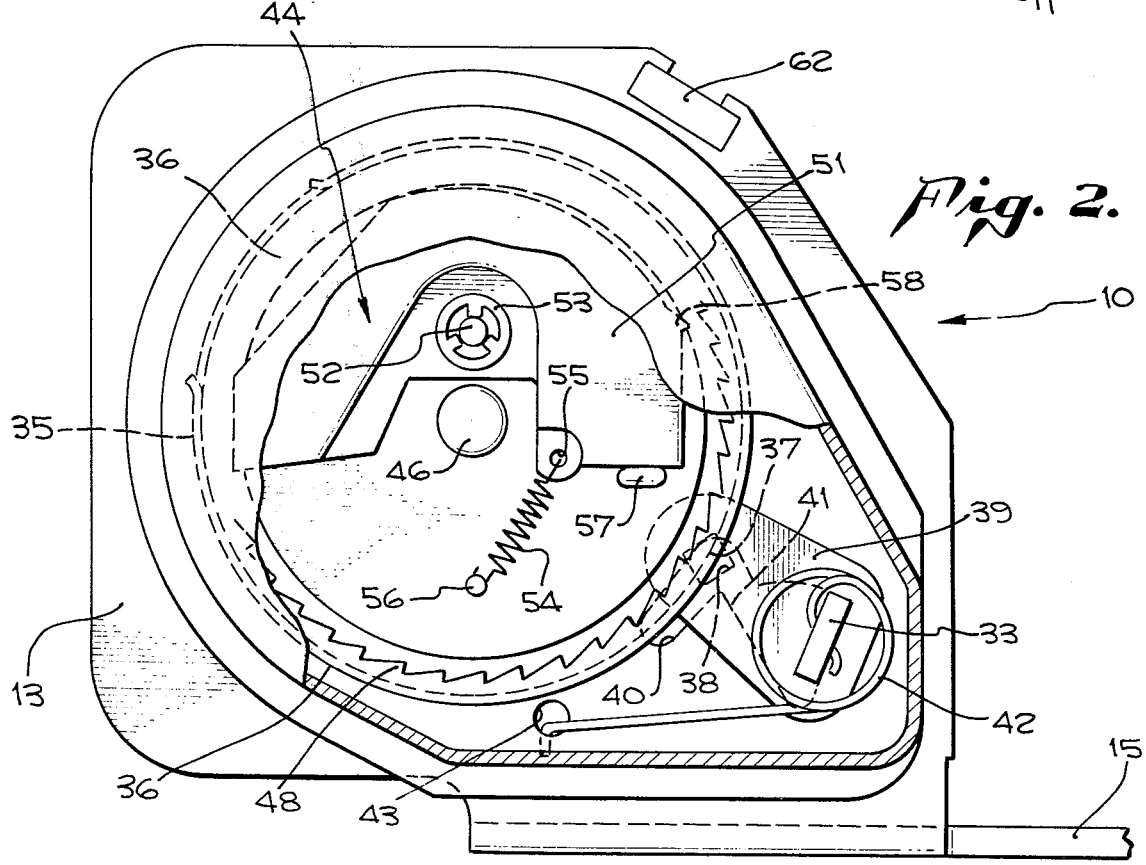
FIG. 2 is an end view, with portions thereof omitted for convenience of illustration, of the safety belt retractor of FIG. 1.

Inertia responsive means, indicated generally at 44, FIG. 2, may optionally be provided for actuating clutch spring 35 to thereby lock pawl 31 into engagement with ratchet wheels 21, 22. Such inertia responsive means includes the aforementioned cup member 36 which has a generally centrally located aperture 45 (see FIG. 3) surrounding a reduced portion 18' of shaft 18. A stub shaft 46 extends through an aperture in portion 18' and is pressfit or the like at one end 47 in a suitable aperture in shaft 18. The interior peripheral surface of cup member 36 is provided with ratchet teeth 48 (FIG. 3) for reasons to be discussed shortly.

Stub shaft 46 includes a second portion 49 of larger diameter than end 47 conformably fitting into a like configured aperture 46' in the hub of a generally circular flange member 50 so that flange member 50 turns with shafts 18 and 46 in use.

The inertia responsive means 44 (FIG. 2) further includes an inertia member or plate 51 turnably mounted on a cylindrical boss 52 extending from flange member 50 and radially offset from the axes of shaft 18. It is to be understood that the axis of boss 52 passes through the center of gravity of plate 51. A lock washer 53 may be provided on boss 52 to retain plate 51 in position thereon.

A coil calibration tension spring 54 has one end thereof connected to an aperture 55 in inertia plate 51 and has its other end connected to a boss 56 provided on flange member 50 and acts to normally hold inertia plate 51 in position. As will be discussed further hereinbelow, the tension of calibration spring 54 determines the g settings, i.e., the acceleration of gravity, of the retractor 10. This may be about 0.7 g's, for example. Flange member 50 further includes a stop member 57 for limiting the movement of plate 51.

One or more ratchet teeth 58 are provided on the outer peripheral surface of inertia plate 51 and are adapted to engage the teeth 48 of cup member 36. A housing 78 is secured to side wall or flange 13 to retain the various components therein. The operation of the inertia responsive means, indicated generally at 44, will now be described.

The aforementioned clutch spring 35 embraces the outer cylindrical surface of cup member 36 and resiliently grips this surface with a definite predetermined pressure. Thus, clutch spring 35 and cup member 36 constitute a preloaded clutch, whereby the clutch spring 35 tends to turn with cup member 36 but will slip hereon if held against turning by a force exceeding a predetermined amount.

Figure 4:
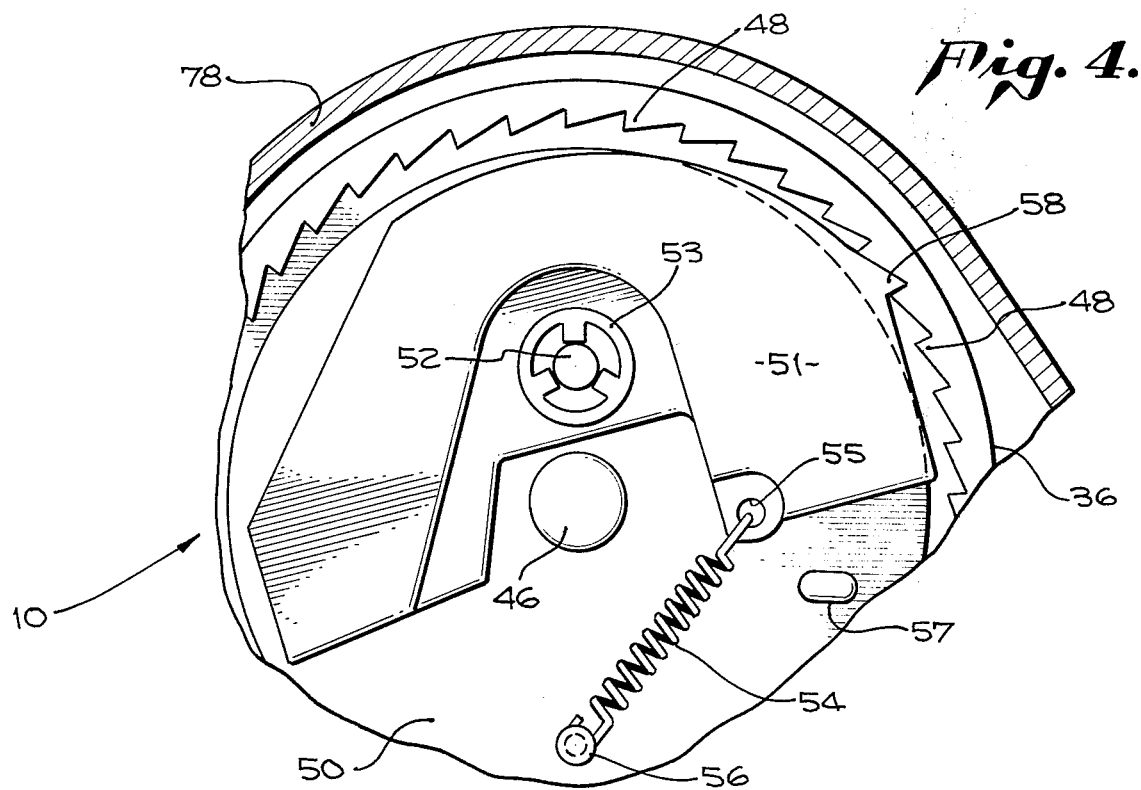
FIG. 4 is a view similar to FIG. 2 showing a detailed portion thereof.

It can be seen that in the event of a crash resulting in a sudden deceleration of the vehicle in which retractor 10 is mounted, the user's body tends to be thrown forward suddenly so that the strap 17 starts to pay out of reel 16 with acceleration. Depending upon the tension of calibration spring 54, if a predetermined dangerous acceleration of the user's body is reached, the inertia plate 51 will tend to maintain its original velocity and hence will turn with respect to its pivotal support on boss 52, thus turning counterclockwise as viewed in FIG. 2 against the tension of spring 54 so that its ratchet teeth 58 engage teeth 48 on cup member 36 due to the eccentric mounting of plate 51 with respect to shaft 18 as shown in FIG. 4. Thus, cup member 36 is now caused to turn clockwise within reel 16, and clutch spring 35 turning therewith moves via tab 37 within slot 38 thereby moving lever member 39 and pawl 31. The tabs 32 of pawl 31 are thus urged by spring member 42 to lock the ratchet wheels 21, 22 simultaneously to prevent further payout of strap 17. With reel 16 so locked and held firmly at both ends, the shaft 18 is relieved of high torsional loads which otherwise would occur were reel 16 locked at one end only, so that retractor 10 is capable of withstanding enormous strap loads in use.

Once the force on strap 17 is relieved, then it will retract automatically through the action of rewind spring 26. As the spring 26 starts to rewind, the flange member 50 will start to turn counterclockwise, as viewed in FIG. 2, causing the teeth 58 of inertia plate 51 to disengage from the teeth 48 of cup member 36, and calibration spring 54 will turn plate 51 back to its original position (see FIG. 2) abutting against boss 56. The return of inertia plate 51 will also move clutch spring 35 back to its original position in FIG. 2 whereby lever member 39 and spring 42 returns pawl 31 to its original position. This of course unlocks tabs 32 from the teeth of ratchet wheels 21, 22 placing reel 16 in condition for another locking operation when required. There is no possibility of retractor 10 locking during windup of spring 26.

Figure 5:
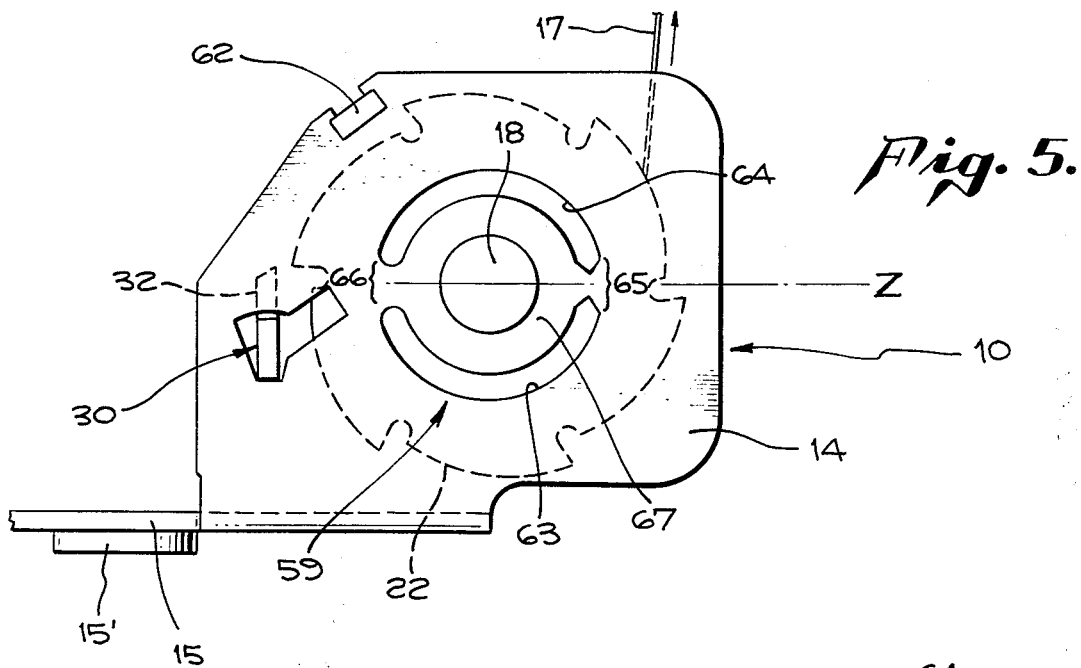
FIG. 5 is a side view, similar to FIG. 2, showing the position of the frame of the safety belt retractor of FIGS. 1 through 4 prior to placing a load thereon.

Of course, inertia responsive means 44 may be eliminated entirely, as discussed hereinabove, thus presenting a conventional self-locking reel. In either case, as particularly contemplated within the present invention reel rotation preventing means are provided, indicated generally at 59, for preventing reel 16 against rotation in either direction when pawl 31 engages the teeth of gears 21, 22 and a predetermined load is placed on 17. In the exemplary embodiment, as shown in FIG. 5, such reel rotation preventing means includes flange connecting means which may comprise one or more crossbars, such as a cross-bar 62, which may be provided on retractor 10 interconnecting side walls or flanges 13, 14 (as also shown in FIG. 2). Such cross-bar extends generally parallel to shaft 18 and beyond the outer periphery of ratchet wheels 21, 22 as shown in FIG. 5. As particularly contemplated within the present invention, cross-bar 62 is adjacent the outer periphery of ratchet wheels 21, 22 for reasons to be discussed shortly.

Figure 6:
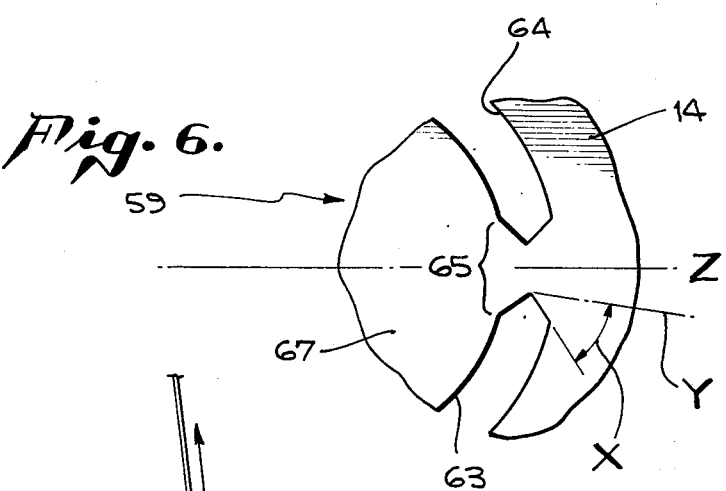
FIG. 6 is a detailed view of a portion of the frame of the reel of FIG. 5.

As shown in FIG. 5, the reel rotation locking means, indicated generally at 59, further includes flange deformation means, as for example, a pair of crescent-shaped slots 63, 64 cut out of side walls or flanges 13 (only one flange being shown in FIG. 5). Slots 63, 64 extend about shaft 18 and are spaced therefrom, having their axes generally coincident with the central axis of shaft 18. A tab 65 or the like separates slots 63, 64. The slots 63, 64 may taper generally to a point as shown in FIG. 6, the sides thereof forming an angle $x$ of about 45° with respect to a line $y$ extending generally normally to the central longitudinal axis of slots 63, 64. As shown in both FIGS. 5 and 6, a line $z$ extends through both tab 65 and the spacing 66 formed between the ends of slots 63, 64 opposite tab 65. Preferably, line $z$ should extend generally normal to the central longitudinal axis of strap 17 as it is unwound off of reel 16.

The width or area of tab 65, which, as will be discussed shortly is the shear zone, is determined by the amount of predetermined load desired before reel 16 is prevented from rotation in either direction. Thus, both the orientation of axis or line $z$ and the area of the shear zone determines the design load of the failure point. That is, varying the angular relationship or radial location of line $z$ and the width of shear zone or tab 65 determines the desired failure point. The optimum point is where strap 17 pulls off reel 16 at 90° to the line $z$. Thus, if this angle is 75° instead of 90°, the retractor 10 shears at a higher load; if the width of tab 65, which may, for example, be about 0.045 inches tip-to-tip of slots 63, 64 having a flange of about, for example, ⅛ inch thick, is reduced about 50%, the retractor 10 shears at one-half the load (i.e., the shear load also being reduced about 50%). Although an angle $x$ of about 45° is shown, the slots 63, 64 at tab 65, may be rounded or tapered to a point. However, such slots may be more difficult to manufacture and the configuration illustrated has been chosen as the most efficient and easily manufactured. Of course, slots 63, 64 may take various configurations as long as they are cut out of the portions of flanges 13, 14 surrounding shaft 18.

Figure 7:
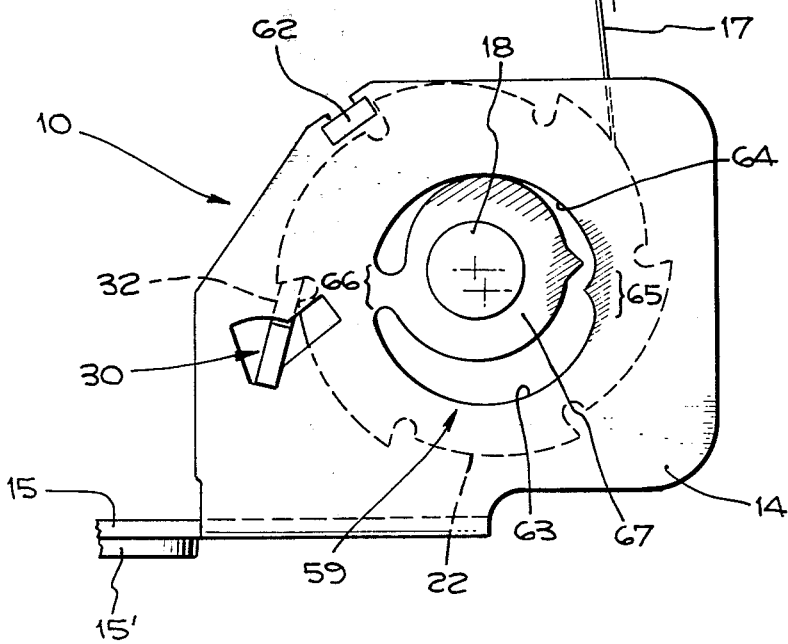
FIG. 7 is a side view similar to FIG. 5 showing the position of the frame after a load is placed thereon.

In operation, pawl tab 32 in FIG. 5 is shown in non-engaging position with respect to ratchet wheel 21. With pawl tab 32 engaging the teeth of wheel 21, as shown in FIG. 7, and heretofore described, when a predetermined load is placed on strap 17, flanges 14, 13 will turn or pivot about tab 32 which forces shaft 18 upwardly, i.e., from the FIG. 5 to the FIG. 7 position. Under load, the shear area 65 between slots 63, 64 deforms and breaks. The force on the area 67, between slots 63, 64 and shaft 18, pivots area 67 about area 66 between slots 63, 64 permitting ratchet wheel 21 to swing up and engage cross-bar 62. Thus, the axis of reel 16 is displaced. The teeth of wheels 21, 22 move into locking engagement with cross-bar 62 and thus the webbing or strap 17 of retractor 10 cannot be unwound from reel 16 or retracted thereon since reel 16 cannot rotate in either direction. However, the retractor 10 continues to take the load for which it was designed due to the physical engagement of area 67 and the face of slot 64. Thus, the reel 16 is prevented from rotation which would normally unlock or release pawl tab 32 from engagement with wheel 21 as heretofore described.

The retractor 10 may be designed to take a specified load which may be about 3,000 to 4,000 pounds before complete failure thereof. Such failure may, for example, take place during an impact at about 30 mph. However, the reel rotation preventing means, as discussed hereinabove, may be designed to fail at a lesser load level, as for example, at 1,000–1,500 pounds, That is, the retractor 10 is in a condition that is no longer usable since the reel is prevented from further rotation but continues to take the load for which it was designed. Of course, the reel rotation preventing means could be activated in an impact at speeds as low as, for example, 10 to 15 mph; however, the user would not approach the load level of the reel rotation preventing means during normal usage.

I claim:

1. In a safety belt retractor having a frame comprising a pair of spaced flanges, a shaft extending transversely of said flanges and journalled for rotation thereon, a reel fixed to said shaft and having one end of a strap secured to said shaft and wound about said reel, the other end of said strap being adapted to extend outwardly of said flanges, a rewind spring operatively connected to both said frame and said shaft, at least one ratchet tooth gear mounted on said shaft and rotatable therewith, a lockbar mounted on said frame and having at least one locking pawl thereon adapted to engage the teeth of said ratchet tooth gear, said lockbar being movable between positions engaging said teeth and out of engagement therewith, the improvement which comprises:

reel rotation preventing means associated with said frame for permanently deforming a portion of said frame in a manner preventing subsequent rotation of said reel thereby preventing said reel from rotation in either direction when said lockbar is in locking engagement with said gear and load is placed on said strap above a predetermined amount.

2. In the retractor of claim 1 wherein said reel rotation preventing means includes flange connecting means operatively connected to both said flanges, and flange deformation means associated with said flanges adapted to deform said flange when a load above a predetermined amount is placed on said strap when said lockbar is in locking engagement with said gear and displace said flanges a distance sufficient to permit said gear to engage said flange connecting means.

3. In the retractor of claim 2 wherein said flange connecting means includes at least one cross-bar interconnecting said flanges and extending both generally parallel to the central axis of said shaft and beyond the outer periphery of said gear.

4. In the retractor of claim 3 wherein said flange deformation means includes aperture means extending through at least a portion of the walls of said flanges.

5. In the retractor of claim 3 wherein said flange deformation means includes a pair of arcuate slots extending through the walls of both of said flanges and spaced from one another along their central longitudinal axes, the central longitudinal axes of said slots being generally coincident with each other and generally equally spaced from the central longitudinal axes of said shaft.

6. In the retractor of claim 5 including a shear area formed between said slots.

7. In the retractor of claim 6 wherein said shear area is located at one of the spacings between said slots.

8. In the retractor of claim 7 wherein each of said slots tapers generally to a point at said shear area.

9. In the retractor of claim 7 wherein a shear axis is formed along a line extending both generally normal to the central longitudinal axes of said slots and through both said shear area and the spacing formed between said slots at the ends thereof opposite said shear area, said shear axis extending at an angle of about 90° to the central longitudinal axis of said strap as it is extended off of said reel.

10. In a safety belt retractor having a frame comprising a pair of spaced flanges and a cross-bar fixedly secured to both said flanges and extending transversely thereof, a shaft extending transversely of said flanges and generally parallel to said cross-bar and jounalled for rotation thereon, a reel fixed for rotation on said shaft and having one end of a strap secured to said shaft and wound about said reel, the other end of said strap being adapted to extend outwardly of said flanges, a rewind spring operatively connected to both said frame and said shaft, at least one ratchet tooth gear mounted on said shaft and rotatable therewith, said ratchet tooth gear being spaced from said cross-bar, a lockbar mounted on said frame and having at least one locking pawl thereon adapted to engage the teeth of said ratchet tooth gear, said lockbar being movable between positions engaging said teeth and out of engagement therewith, the improvement which comprises:

cross-bar engaging means associated with said flanges for pivoting at least a portion of said flanges about said lockbar when said lockbar is in locking engagement with said teeth of said ratchet tooth gear to a position whereby the teeth of said ratchet tooth gear engages said cross-bar preventing rotation of said spool when a load above a predetermined amount is placed on said strap.

* * * * *